(12) United States Patent
Doron et al.

(10) Patent No.: US 12,348,556 B2
(45) Date of Patent: *Jul. 1, 2025

(54) TECHNIQUES FOR PROTECTING AGAINST EXCESSIVE UTILIZATION OF CLOUD SERVICES

(71) Applicant: RADWARE, LTD., Tel Aviv (IL)

(72) Inventors: Ehud Doron, Moddi'in (IL); Nir Ilani, Givat Brenner (IL); David Aviv, Tel Aviv (IL); Yotam Ben Ezra, Ra'anana (IL); Amit Bismut, Kiryat Motzkin (IL)

(73) Assignee: Radware Ltd., Tel Aviv (IL)

( * ) Notice: Subject to any disclaimer, the term of this patent is extended or adjusted under 35 U.S.C. 154(b) by 711 days.

This patent is subject to a terminal disclaimer.

(21) Appl. No.: 17/202,095

(22) Filed: Mar. 15, 2021

(65) Prior Publication Data

US 2021/0281603 A1 Sep. 9, 2021

Related U.S. Application Data

(63) Continuation of application No. 15/940,360, filed on Mar. 29, 2018, now Pat. No. 10,951,648, which is a
(Continued)

(51) Int. Cl.
*H04L 29/06* (2006.01)
*G06N 5/048* (2023.01)
(Continued)

(52) U.S. Cl.
CPC ......... *H04L 63/1458* (2013.01); *G06N 5/048* (2013.01); *H04L 47/122* (2013.01);
(Continued)

(58) Field of Classification Search
CPC ............... H04L 63/0209; H04L 63/101; H04L 63/1416; H04L 63/1458
See application file for complete search history.

(56) References Cited

U.S. PATENT DOCUMENTS 8,100,039 B2  1/2012  Gass
8,613,089 B1  12/2013  Holloway et al.
(Continued)

OTHER PUBLICATIONS

Dickerson, et al., "Fuzzy Network Profiling for Intrusion Detection," 2000, Ames, Iowa, IEEE Xplore.
(Continued)

*Primary Examiner* — Jeffrey C Pwu
*Assistant Examiner* — Thong P Truong
(74) *Attorney, Agent, or Firm* — M&B IP Analysts, LLC

(57) ABSTRACT

An out-of-path defense platform protecting against excessive utilization of a cloud service providing a cloud hosted application comprising a controller communicatively coupled to a detector and a mitigator; wherein the detector receives telemetries from sources that are configured to collect telemetries related to the traffic between end user devices and an edge network that distributes traffic for the cloud hosted application, the telemetries being out-of-path information for traffic to and from the cloud-hosted application, wherein a portion of the telemetries relate to operation of a portion of a cloud computing platform hosting the cloud-hosted application, and detects, using the collected telemetries and a learned normal utilization behavior of each cloud service for the cloud-hosted application, excessive utilization of a cloud service by the cloud hosted application; and wherein the controller, upon detection of the excessive utilization, causes mitigation, by the mitigator, of the excessive utilization of each cloud service.

19 Claims, 6 Drawing Sheets

Related U.S. Application Data continuation-in-part of application No. 15/907,905, filed on Feb. 28, 2018, now Pat. No. 11,405,417.

(60) Provisional application No. 62/467,534, filed on Mar. 6, 2017.

(51) Int. Cl.
    *H04L 9/40* (2022.01)
    *H04L 47/122* (2022.01)
    *G06N 20/00* (2019.01)

(52) U.S. Cl.
    CPC ...... *H04L 63/0227* (2013.01); *H04L 63/1425* (2013.01); *H04L 63/18* (2013.01); *G06N 20/00* (2019.01); *H04L 63/101* (2013.01); *H04L 63/1416* (2013.01)

(56) References Cited

U.S. PATENT DOCUMENTS

| | | | |
|---|---|---|---|
| 8,739,244 | B1 | 5/2014 | Wu et al. |
| 8,843,645 | B2 | 9/2014 | Annamalaisami et al. |
| 9,462,010 | B1 | 10/2016 | Stevenson |
| 9,729,414 | B1 | 8/2017 | Oliveira et al. |
| 2008/0083029 | A1 | 4/2008 | Yeh et al. |
| 2011/0010463 | A1 | 1/2011 | Christenson et al. |
| 2012/0124666 | A1 | 5/2012 | Kim et al. |
| 2012/0216282 | A1 | 8/2012 | Pappu et al. |
| 2012/0272289 | A1 | 10/2012 | Chang et al. |
| 2012/0324573 | A1 | 12/2012 | Kim et al. |
| 2013/0055375 | A1 | 2/2013 | Cline et al. |
| 2013/0333029 | A1 | 12/2013 | Chesla et al. |
| 2014/0109225 | A1* | 4/2014 | Holloway ........... H04L 63/1433 726/23 |
| 2014/0157405 | A1 | 6/2014 | Joll et al. |
| 2014/0215621 | A1 | 7/2014 | Xaypanya et al. |
| 2014/0283051 | A1* | 9/2014 | Doron ................. H04L 63/1458 726/23 |
| 2014/0304817 | A1 | 10/2014 | Kim et al. |
| 2014/0331304 | A1 | 11/2014 | Wong |
| 2016/0127408 | A1 | 5/2016 | Miu et al. |
| 2016/0359861 | A1 | 12/2016 | Manov et al. |

OTHER PUBLICATIONS

Kiran et al., "Mining Concept Drifting Network Traffic in Cloud Computing Environments", 12th IEEE/ACM International Symposium on Cluster, Cloud and Grid Computing, 2012, pp. 721-722.
Shahresani et al., "Visualization of invariant bot behavior for effective botnet traffic detection", 2012 IEEE International Symposium on Telecommunication Technologies, 2012.

* cited by examiner

TECHNIQUES FOR PROTECTING AGAINST EXCESSIVE UTILIZATION OF CLOUD SERVICES

CROSS-REFERENCE TO RELATED APPLICATIONS

This application is continuation of U.S. patent application Ser. No. 15/940,360, filed on Mar. 29, 2018, now pending, which in turn is a continuation-in-part of U.S. patent application Ser. No. 15/907,905 filed on Feb. 28, 2018, which claims the benefit of U.S. Provisional Application No. 62/467,534 filed on Mar. 6, 2017. The contents of the above-referenced applications are hereby incorporated by reference.

TECHNICAL FIELD

This disclosure relates generally to cyber security systems and, more specifically, to techniques for defending against excessive utilization of cloud services by applications due to illegitimate traffic.

BACKGROUND

With the rapid adoption of use of computers in modern society, computer systems have become increasingly subject to cyber-attacks intended to disrupt the systems, steal data, cause application defacement, manipulate their behavior, or a combination of these. Accordingly, the field of cyber security has developed to combat such cyber-attacks. Cyber security is particularly important in cloud computing platforms, where multiple computer resources interact remotely in order to provide the required services, e.g., sharing of files and applications. Organizations have increasingly adapted their applications to cloud computing platforms, either completely or via hybrid implementations (i.e., such that one part of the application is implemented on premises of an enterprise data center and another part of the application is hosted in one or more public clouds). This makes defending public cloud-hosted applications much more complex, as the applications may be hosted in multiple public cloud computing platforms along with on-premise part of the applications.

Some leading public cloud service providers include Amazon®, Microsoft®, Google®, Oracle®, and Hewlett-Packard®. To ensure their tenants' services are not interrupted, the cloud service providers typically protect their infrastructures against cyber security threats. The infrastructure may include, for example, a cloud computing platform in which an application is hosted and an edge network (e.g., a content delivery network) providing cloud edge services for delivering traffic to and from the application. As an example, Amazon® Web Services hosts applications in its cloud computing platform and distributes content through its CloudFront® content delivery network (CDN). As a result, Amazon® utilizes security systems to defend its cloud computing platform and its CDN. This ensures that availability of its cloud infrastructure and various services remain consistent even during cyber-attacks.

Although existing solutions implemented by cloud service providers protect their infrastructures, such solutions are not targeted at protecting tenants (i.e., customers and their cloud-hosted applications) against over-utilization of cloud services. Such over-utilization of cloud services occurs when, for example, an abnormally high amount of traffic is processed by a cloud-hosted application and is typically the result of malicious activity such as, for example, a distributed denial-of-service (DDOS) attack. As a result of this over-utilization, a high number of requests are served at significant cost to the customer.

The issue is that the tenants utilizing the various cloud services for serving their applications' needs do not own the infrastructure; instead, it is owned by another entity (i.e., the cloud service provider). As an example, an application stack may have proprietary code of an application owner running on top of predefined compute packages of a cloud service provider. The application owner has less control over the cloud service provider's compute packages with respect to, for example, deployment resource management and behavior under attack.

As a result, excessive utilization may significantly affect customers (or Total Cost of Ownership) but may not affect the infrastructure of the cloud service provider sufficiently to trigger mitigation by the cloud service provider's security systems, or others. Rather, because cloud services are intended to be flexible in implementation, applications may be scaled in response to changes in usage characteristics. As a particular example, micro-services break down software into functional components that can be autonomously scaled to meet user needs. As a result, any spikes in usage may trigger scaling up to serve all traffic even when much of the spiking traffic is illegitimate, i.e. attacker traffic, and should not be served. This scaling up results in higher costs to the application owner while allowing the cloud services to adapt to legitimate application needs.

That is, under a distributed denial of service (DDOS) attack, all servers, systems, and/or networks configured to provide the cloud services to the cloud-hosted applications may be operating, but the tenants will still be affected by the excessive utilization of the cloud services caused by the DDOS attack. The effect on the tenants may come in the form of cost, i.e., the overall cost of operating the cloud-hosted applications dramatically increasing. The current protection security solutions are not designed to protect the tenants from malformed and very high utilization of cloud services and, in particular, cloud services delivered via edge networks such as CDNs.

Specifically, a problem arises because application hosting service providers typically charge per request, whether legitimate or not. When an attack involving illegitimate traffic, for example, a DDOS attack, targets an application hosted in an infrastructure, the attack may not generate enough illegitimate traffic to disrupt the infrastructure and, therefore, may not be mitigated. On the other end, such illegitimate traffic can abuse various cloud services such that the overall cost, to the application owner, imposed by this usage is very high. Thus, the application owner is charged for all requests, including the malicious traffic from the attack. The overall result of such attacks is significant monetary expenditure in term of application Total Cost of Ownership.

Continuing the Amazon® example, while 2 billion illegitimate requests per day may disrupt a smaller infrastructure, such requests may not affect the infrastructure of Amazon® Web Services and, as a result, the illegitimate requests are served and billed for. This can result in dramatically enormous expenses for traffic that has no value to the application owner.

One current solution for mitigating costs is merely through insurance. The insurance is offered by the cloud service providers. However, this solution does not actually address the security challenges and, instead, merely offsets costs caused by the over-utilization. Further, the insurance itself increases upfront costs for the tenants and may need to cover very high expenses. Additionally, such insurance can typically only be provided by the cloud service provider directly, and cannot be offered by third parties due to lack of access to responsibilities for the actual cloud services consumptions.

Furthermore, protection of edge, and maybe other, cloud services is separated from protecting applications executed in a cloud-computing platform. Thus, attacks on the cloud-hosted applications are only detected when the attacks are detected as attempts to bring down the cloud computing platform or edge network.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a defense platform for protecting against excessive utilization of at least one cloud service used for providing a cloud-hosted application, wherein the defense platform is deployed out-of-path of traffic between a plurality of end user devices and the cloud-hosted application. The defense platform comprises at least one detector; a mitigator; and a controller communicatively connected to the detector and the mitigator; wherein the at least one detector is configured to: receive telemetries from a plurality of sources, wherein each source is configured to collect telemetries related to the traffic between a plurality of end user devices and an edge network configured at least to distribute traffic for the cloud-hosted application, wherein the telemetries are out-of-path information with respect to traffic to and from the cloud-hosted application and wherein at least a portion of the telemetries collected are related to operation of a portion of at least one cloud computing platform hosting the cloud-hosted application; detect, based on the collected telemetries and at least one learned normal utilization behavior of each cloud service for the cloud-hosted application, excessive utilization of at least one of the at least one cloud service by the cloud-hosted application; and wherein the controller, upon detection of the excessive utilization of the at least one cloud service by the cloud-hosted application, is configured to cause mitigation, by the mitigator, of the excessive utilization of each cloud service.

Certain embodiments disclosed herein also include a method for protecting against excessive utilization of at least one cloud service used for providing a cloud-hosted application. The method comprises: receiving, at a defense platform deployed out-of-path of traffic between a plurality of end user devices and the cloud-hosted application, telemetries from a plurality of sources, wherein each source is configured to collect telemetries related to at least one of the at least one cloud service, wherein the telemetries are out-of-path information with respect to traffic to and from the cloud-hosted application and wherein at least a portion of the telemetries collected are related to operation of a portion of at least one cloud computing platform hosting the cloud-hosted application; detecting, based on the collected telemetries and a learned normal utilization behavior for the cloud-hosted application, excessive utilization of at least one of the at least one cloud service by the cloud-hosted application; and causing mitigation, at the defense platform, of the excessive utilization of each cloud service upon detection of the excessive utilization of the at least one cloud service by the cloud-hosted application.

Certain embodiments disclosed herein also include a system for protecting against excessive utilization of at least one cloud service used for providing a cloud-hosted application. The system comprises a processing circuitry; and a memory, the memory containing instructions that, when executed by the processing circuitry, configure the system to: receive, at a defense platform deployed out-of-path of traffic between a plurality of end user devices and the cloud-hosted application, telemetries from a plurality of sources, wherein each source is configured to collect telemetries related to at least one of the at least one cloud service, wherein the telemetries are out-of-path information with respect to traffic to and from the cloud-hosted application and wherein at least a portion of the telemetries collected are related to operation of a portion of at least one cloud computing platform hosting the cloud-hosted application; detect, based on the collected telemetries and a learned normal utilization behavior for the cloud-hosted application, excessive utilization of at least one of the at least one cloud service by the cloud-hosted application; and cause mitigation, at the defense platform, of the excessive utilization of each cloud service upon detection of the excessive utilization of the at least one cloud service by the cloud-hosted application.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
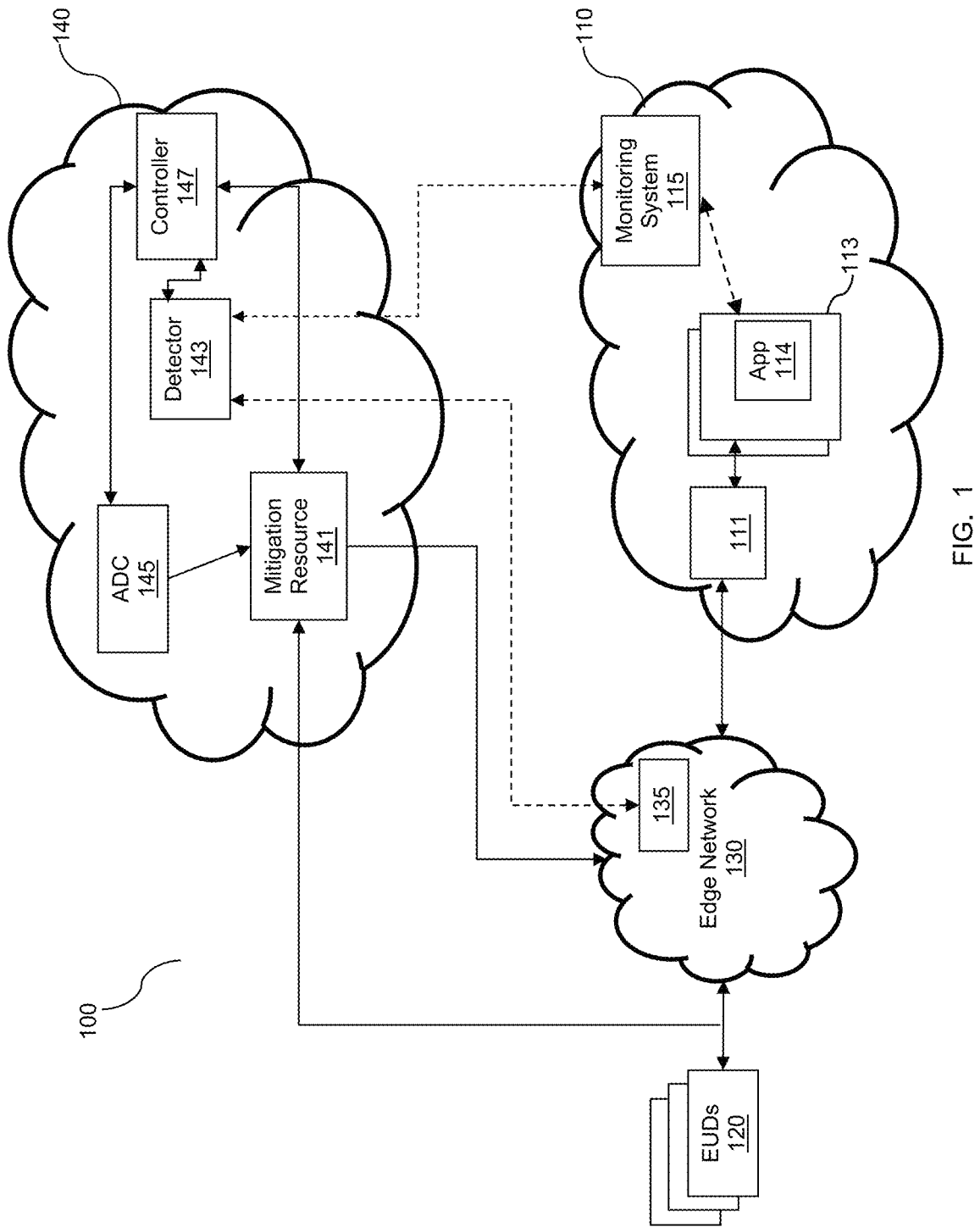
FIG. 1 is a network diagram illustrating deployment of a defense platform according to various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and defense platform for protecting against excessive utilization of cloud services by cloud-hosted applications. The excessive utilization includes an abnormally high amount of service requests demonstrating that at least some traffic related to a protected cloud-hosted application is illegitimate, for example as compared to a learned baseline utilization behavior for the application. Such abnormal amounts of traffic can result in the cloud-hosted application serving illegitimate requests but may not be detected by systems of the cloud platform or by detection and mitigation systems protecting the cloud-hosted application. For example, excessive utilization due to high numbers of requests received during a DDOS attack may be mitigated. The cloud-hosted application may utilize cloud various services located in the cloud computing platform (e.g., services such as FaaS, storage, etc.), an edge network (e.g., services such as CDN, DNS, etc.), or both.

Various embodiments disclosed herein may be utilized for detecting and mitigating excessive utilization of cloud services caused by illegitimate traffic such as malicious traffic used by denial of service (DOS) or distributed denial of service (DDOS) attacks (hereinafter referred to collectively as "DDOS attacks", merely for simplicity purposes). The DDOS attacks may be attacks directed at network layers, for example layer-3 (L3) attacks, layer-4 (L4) attacks, or layer-7 (L7) attacks including attack types such as HTTP/HTTPS/TCP Flood, Low and Slow HTTP/HTTPS, malformed HTTP/HTTPS, and the like. The DDOS attacks may result in excessive utilization of services, but the application may be operable as DDOS mitigation solutions would protect the application, but not the services utilized by the application.

The disclosed embodiments allow for mitigating high volume, or otherwise excessive utilization of cloud services due to illegitimate traffic such as traffic from cyber-attacks (e.g., DDOS attacks). Mitigating excessive utilization of cloud services allows for cost protection against costs related to serving illegitimate traffic, and may further ensure that operating requirements (e.g., requirements defined in service level agreements such as availability, latency, etc.) are met.

In an embodiment, telemetries are received at a detector deployed out-of-path of traffic between end user devices and an edge network configured at least to distribute traffic for a cloud-hosted application. The cloud-hosted application may be hosted in a cloud computing platform of a cloud service provider. The telemetries may be received from sources including one or more resources and cloud services deployed in the edge network, the cloud computing platform, or both. The received telemetries are monitored or otherwise investigated to detect excessive utilization of cloud services in the edge network, the cloud computing platform, or both. Upon detection of excessive utilization, the traffic associated with the utilization is mitigated, for example via redirection to a mitigation resource. The traffic may be cleaned to remove illegitimate traffic. The clean traffic is returned to the edge network for delivery to the cloud-hosted application. As a result of the mitigation, malicious traffic is prevented from reaching the cloud infrastructure (i.e., the edge network, the cloud computing platform, or both), the excessive utilization of the service is eliminated, and therefore extra costs associated with serving the malicious traffic are reduced.

The detector is configured to concurrently process telemetries related to different cloud services or aspects of operation of the cloud-hosted application (e.g., availability) in order to provide multiple concurrent detection of excessive utilization of different cloud services by the cloud-hosted application. In some implementations, multiple detectors, each configured to process a different set of telemetries, may be utilized for the multiple concurrent detection.

FIG. 1 shows an example network diagram 100 utilized to describe the deployment of the defense platform 140 according to various disclosed embodiments. The example network diagram 100 illustrates a cloud computing platform 110, a plurality of end-user devices (EUDs) 120, an edge network 130, and a defense platform 140.

The cloud computing platform 110 may be, but is not limited to, a public cloud, a private cloud, or a hybrid cloud. Example cloud computing platforms include Amazon® Web Services (AWS), Cisco® Metacloud, Microsoft® Azure®, Google® Cloud Platform, HP® Cloud, and the like. In an embodiment, the cloud computing platform 110 may serve as infrastructure-as-a-service (IaaS), Platform-as-a-Service (PaaS), Function as a Service (FaaS), or a combination thereof.

The cloud computing platform 110 may further include a monitoring system 115 configured to collect telemetries related at least to attributes of traffic coming in to the cloud computing platform 110, going out of the cloud computing platform 110, or both. The monitoring system 115 may further collect other telemetries related to, e.g., utilization of computing resources (e.g., CPU and memory), load balancing web transactions counts and sizes, HTTP/HTTPS response codes metrics, number of requests, number of errors, number of TCP connections, cloud services usage like database transactions, FaaS usage and the like.

The cloud computing platform 110 executes an application (App) 114 (the "cloud-hosted application"). The application 114 may be provisioned on a single cloud, or in combination between on premises and multiple clouds. The application 114 may be a web application, a cloud-hosted application, or any other software application or software resource executed by a server. Examples of the application 114 may include an email application, an e-commerce application, a financial application, a mobile application, an Internet of Things (IoT) application, a storage service, a content streaming service, a company Website, or any other service or application that can be accessed by a web browser (not shown). The application 114 is accessed to provide a cloud-hosted service, e.g., content or other functions, to the EUDs 120.

Typically, the execution of the application 114 is performed by one or more servers (collectively shown as servers 113) provided by the cloud provider. Each server 113 may be a virtual machine, a physical machine, or a container. A virtual machine or a container may include any virtual environment for executing code or applications.

The cloud computing platform 110 typically includes an edge entity 111, for example, a load balancer configured to perform load balancing on the load among the servers 113.

In an optional deployment, the EUDs 120 are clients configured to access content or cloud-hosted services from the application 114 hosted in the cloud computing platform 110 by sending requests via the edge network 130 and receiving, from the edge network 130, data from the application 114. To this end, the edge network 130 may be communicatively connected between the EUDs 120 and the cloud computing platform 110. Each of the EUDs 120 may be, but is not limited to, a personal computer, a laptop, a tablet computer, a smartphone, a smart TV, an IoT device, a wearable computing device, or any other device capable of sending and receiving application data. The application 114 may be, but is not limited to, an email service, an e-commerce application, a financial application, a storage, a content streaming application, a company Website, and the like.

The edge network 130 is a system of distributed servers (a network) that deliver webpages and other Web content to a user based on the geographic locations of the user, the origin of the webpage, a content delivery server, and content age and type (static or dynamic). In some implementations, other services (e.g., web caching, Amazon® Route 53 or other DNS services, a web application firewall or other firewall service, security services, etc.) may be provided via the edge network 130. The edge network 130 may be utilized to provide services such as, for example, a content delivery network (CDN).

The EUDs 120, the edge network 130, and the platforms 110 and 140 are all communicatively connected through the Internet, dedicated tunnels or any other communication network (not shown). The edge network 130 cloud services can be delivered by the cloud computing platform 110 providers, or by other cloud service providers.

The protection of the application 114 against excessive utilization of cloud services is performed via the defense platform 140. In an example implementation, the defense platform 140 is a cloud computing platform managed by a cloud security vendor (or security service provider) that is not a service provider of the protected cloud computing platform 110.

The defense platform 140 includes a mitigation resource (also known as a mitigator) 141, a detector 143, and a controller 147. In some implementations, the defense platform 140 may include an application delivery controller (ADC) 145. It should be noted that, in the example implementation shown in FIG. 1, the defense platform 140 is separate from the cloud computing platform 110 and from the edge network 130. However, the defense platform 140 may be equally hosted as another tenant of the cloud computing platform or of another cloud platform. That is, the defense platform 140 may be managed by an entity which is not the provider of the cloud services, the edge services, or both. The defense platform 140 may be managed by a Managed Security Service Provider, or by another entity. The defense platform 140 may be integrated in the cloud-computing platform 110.

Typically, the cloud computing platform cloud services (i.e., hosting of the application 114 provided via the cloud computing platform 110), edge network cloud services (i.e., the delivery of traffic to and from the cloud computing platform 110 via the edge network 130 for various service), or both are provided by the same provider (e.g., Amazon®), although in some implementations they may be provided by different providers. Services of different applications (not shown), any of which may be owned by different entities, may equally be provided via the cloud computing platform 110, delivered via the edge network 130, or both.

In an embodiment, the defense platform 140 is configured to collect or receive telemetries from at least a monitoring system 135 deployed in the edge network 130, a monitoring system 115 deployed in the cloud computing platform 110, both, or from other sources configured to collect telemetries related to various operations relate to cloud service which are used to the various operations of the cloud-hosted application. A monitoring system may be, for example, a cloud monitoring system, an application monitoring system, an edge monitoring system, and the like. The telemetries may be collected or received continuously, at regular intervals (e.g., once per minute), and the like. Based on the received telemetries, the detector 143 is configured to detect excessive utilization of the cloud service. The excessive utilization is detected based on a deviation from a learned baseline utilization behavior for the cloud-hosted application 114 with respect to the cloud services previously used by the cloud-hosted application 114.

In an embodiment, the excessive utilization is caused by illegitimate traffic from a cyber-attack such as a DDOS attack. Because a DDOS attack involves directing illegitimate requests (i.e., requests that are not initiated by legitimate end users and are not intended for legitimate use of a cloud-hosted service) to an application, DDOS attacks will cause scaling up of cloud services to meet the increased demand. To mitigate the excessive utilization caused by DDOS attacks, the disclosed embodiments include detecting abnormal utilization behavior and removing the malicious traffic. Detecting the abnormal utilization behavior may be based on different telemetries for excessive utilization caused by different types of DDOS attacks. Specifically, different types of DDOS attacks may affect different services and, thus, different telemetries. The DDOS attack may be directed at network layers, for example layer-3 (L3) attacks, layer-4 (L4) attacks, or layer-7 (L7) attacks including attack types such as HTTP/TCP/HTTPS Flood, Low and Slow HTTP/HTTPS, malformed HTTP/HTTPS, and the like.

In an embodiment, cases of excessive utilization of cloud services cannot be detected by regular DDOS protection mechanisms that simply protect the cloud-hosted application 114. Attacks can affect, for example, services located at the edge network 130 (e.g., a CDN) and not the actual cloud-hosted application 114 located in the cloud computing platform 110. By just collecting telemetries at the cloud computing platform 110, and not also from the edge network 130, such excessive utilization of cloud edge services may be missed in detection.

In an embodiment, the detector 143 is configured to detect excessive utilization caused by application layer (L7) attacks (e.g., flood HTTP/HTTPS and TCP DDOS attacks, low and slow DDOS attacks, DNS attacks, and the like) by analyzing telemetries related at least to incoming and outgoing traffic flows to detect L7 DDOS attacks. The analysis is based on the detection of abnormalities in the traffic flows as a deviation from normal utilization behavior as demonstrated by various cloud services (e.g., CDNs, DNS, etc.) of the edge network 130 and other cloud services used by the application 114 for its various operations.

It should be noted that excessive utilization caused by different types of L7 DDOS attacks may be detected based on different telemetries such as, but not limited to, an average number of active connections, an average number of packets received per second, number of L7 (DNS, HTTP, HTTPS and so on) requests, and so on. Example techniques for detecting abnormalities in behavior caused by L7 attacks are described further in co-pending U.S. patent application Ser. Nos. 15/657,499 and 15/685,484, assigned to the common assignee, the contents of which are hereby incorporated by reference.

In another embodiment, the detector 143 is configured to detect excessive utilization caused by L3 and L4 attacks such as, for example, SYN floods, User Datagram Protocol (UDP) floods, Internet Control Message Protocol (ICMP) attacks, and the like. It should be noted that excessive utilization caused by different types of L3 or L4 DDOS attacks may be detected based on different telemetries such as, but not limited to, a number of packets and bytes of TCP, UDP, ICMP, rest of IP traffic, number of SYN packets, and so on. Example techniques for detecting abnormalities in behavior caused by L3-L4 attacks are described further in co-pending U.S. patent application Ser. No. 15/483,398, the contents of which are hereby incorporated by reference.

When excessive utilization is detected (e.g., on the edge network 130 or in the cloud computing platform 110), the traffic is redirected to the defense platform 140 for mitigation actions instead of proceeding to the edge network 130. Once mitigation actions are taken, traffic may be injected to the edge network 130. In an example implementation, the redirection is performed through a DNS configuration as discussed below in an automated fashion, i.e., without requiring a user to reconfigure the DNS entry. In some configurations, the redirection can be triggered by a user.

In some configurations, the defense platform 140 includes an application delivery controller (ADC) 145. The ADC 145 is configured, among other tasks, to inject clean traffic provided by the mitigation resource 141 back to the edge network 130. The ADC 145 may also perform, among other things, load balancing of traffic directed to the mitigation resource 141. The ADC 145 is also configured to perform various IP address translations, such as network address translation (NAT), ensuring that return traffic from the edge network 130 back to the EUDs 120 is also routed through the defense platform 140.

In an embodiment, the detector 143 in the defense platform 140 is configured to receive or collect telemetries, alerts, logs, or a combination thereof, that are related at least to the utilization of cloud services by the cloud-hosted application 114, from any reliable source regardless of its deployment. Example sources from which telemetries may be received include, but are not limited to, cloud monitoring platforms, application performance monitoring (APM) systems, sources of generic OS level telemetries, monitoring systems (e.g., the monitoring system 115, the monitoring system 135, or both), and the like. Example cloud services may include, but are not limited to, CDN, DNS, WAF, other types of Firewalls, FaaS functions, API, database, storage, media, machine learning, and the like.

The telemetries are collected from sources with respect to the services hosted in the edge network 130 and cloud computing platform 110 in order to detect excessive utilization of those services. As a non-limiting example, when requests are served via a CDN service hosted in the edge network 130 such that the requests are not received at the application 114, analyzing telemetries related only to the application 114 and the cloud computing platform 110 will not lead to detection of excessive utilization of the CDN. As a result, during an attack the CDN would remain up and running, with no notable impact on the edge network 130 infrastructure and at high cost to the owner of the application 114. By receiving telemetries collected with respect to utilization of the CDN, the detector 143 may be configured to detect excessive utilization of the CDN.

The telemetries may be received continuously, at regular intervals (e.g., once per minute), and the like. The telemetries may be related to, but are not limited to, latency, TCP connections count (new and current connections), a TCP connections size, a HTTP/HTTPS session size (in bytes or packets per second), layer-7 HTTP/HTTPS methods or verbs count, other request counts, transaction volume, error rate, number of DNS requests, number of DNS request from specific type combinations thereof, and the like. The telemetries may also include L3 and L4 telemetries such as, but not limited to, byte and packet counts for TCP, UDP, ICMP other IP traffic; SYN packet counts; and the like. The telemetries may be related to, but are not limited to, numbers of FaaS functions calls, API calls, storage usages, and the like. The telemetries may be predefined by one or more operators or owners of the cloud computing platform 110.

In an embodiment, the detector 143 is also configured to implement at least one detection engine for detecting excessive utilization of cloud services caused by DDoS attacks (not shown in FIG. 1). Each detection engine may be configured to monitor the received telemetries, determine and extract a set of features, and to detect DDOS attacks or anomalies using, for example, a fuzzy logic mechanism, a machine learning based classifier, and the like. A feature is an individual measurable property of a phenomenon being observed. For example, a feature can be a number of HTTP/HTTPS requests per second. The abnormalities detected based on the features may be indicative of excessive utilization that may, for example, remain undetected by a detector deployed by the owner of the cloud computing platform 140, therefore resulting in serving illegitimate requests at potentially high cost.

In an embodiment, the detector 143 can implement anomaly detection using a single dimension detection, multiple dimension detection, or a combination thereof. The single or multiple dimension detection may be based on features related to rate variant and invariant-based detection of various telemetries received in real-time.

A single dimension detection may include comparing a single feature's real time values to a learned normal baseline level. In an example implementation, the normal baseline level is determined using the monitored telemetries and may represent an average or otherwise normal typical value for the telemetries and the thresholds may represent deviations from the baseline (e.g., based on a predetermined number of standard deviations from the baseline or as a percentage from the baseline, or as a predefined static value).

The multiple dimension detection can be performed using fuzzy logic inference system (FIS) engines to evaluate various features based on their degree of attacks. Specifically, each feature is evaluated by a FIS engine that evaluates a degree of fulfilment (DoF) score of each feature. The various DoF scores are further evaluated by an expert system that determines the degree of attack. Example implementations for fuzzy logic engines for detecting traffic attributes related to DDOS and DoS can be found in U.S. Pat. Nos. 7,681,235 and 7,836,496, assigned to the common assignee, the contents of which are hereby incorporated by reference. Single and multiple dimension detection are described further herein below with respect to FIGS. 4 and 5, respectively.

In an embodiment, the mitigation resource 141 is communicatively connected to the ADC 145. Upon detection of a potential attack, the controller 147 may be configured to cause a DNS diversion from a normal path of traffic from the EUDs 120 to the mitigation resource 141. That is, when the DNS diversion has occurred, instead of flowing to the edge network 130, traffic from the EUDs 120 is diverted to the defense platform 140.

In an embodiment, the DNS diversion may include updating a CNAME record of each router or other element of the edge network 130 to cause redirection of traffic to the defense platform 140. To this end, the controller 147 may be configured to dynamically, and automatically, change the DNS records of the element of the edge network 130 at its authoritative DNS service, such that any DNS resolving operation, by any edge entity (not shown), to resolve the fully qualified domain name (FQDN) of the respective element is replied with the IP addresses of the defense platform 140. When the DNS is operated by the owner of the cloud computing platform 110, DNS credentials may need to be obtained from the cloud computing platform 110.

The controller 147 is configured to control the traffic diversion to and from the edge network 130, as well all of the mitigation functionalities. Specifically, in an embodiment, upon detection of excessive utilization as may be caused by DDOS attacks, the controller 147 is configured to signal the excessive utilization, or DDOS attack, to the mitigation resource 141. The excessive utilization is detected based on deviation from a learned baseline utilization behavior as described herein. The controller 147 is further configured to cause DNS traffic redirection from the EUDs 120 to the defense platform 140 and, in particular, to the mitigation resource 141.

In another embodiment, the controller 147 may be configured to implement border gateway protocol (BGP) to redirect traffic. By redirecting traffic to the mitigation resource 141, illegitimate traffic that causes the excessive utilization of cloud resources, may be removed before clean traffic is redirected to the edge network 130, thereby reducing costs associated with serving illegitimate traffic. To this end, the controller 147 may be configured to dynamically announce BGP updates to relevant routers (not shown).

The mitigation resource 141 is configured to clean the traffic by executing one or more mitigation actions, and to send the clean traffic to the edge network 130 for delivery to the application 114. Alternatively, the mitigation resource 141 forwards legitimate clean traffic back toward the edge network 130 through the ADC 145. That is, the ADC 145 is configured to send clean traffic to the edge network 130. In some embodiments, the mitigation resource 141 may be, but is not limited to, an "on the cloud" scrubbing center. Example techniques for cleaning malicious traffic are described further in U.S. patent application Ser. No. 15/483,375 assigned to the common assignee, the contents of which are hereby incorporated by reference.

In some implementations, the IP addresses of assets in the edge network 130 are not constant (for example, if the IP address is changed by a cloud service provider during operation). To this end, in an embodiment, the controller 147 may be configured to configure the ADC 145 to issue periodic DNS queries to dynamically learn and update the IP address of the asset to which cleaned traffic should be returned, thereby ensuring that cleaned traffic is returned to an appropriate address. Alternatively, the controller 147 may be configured to perform other methods for dynamic DNS redirection.

In an embodiment, traffic is diverted via DNS traffic redirection. The DNS traffic redirection includes automatically modifying an authoritative DNS record entry to point to a virtual IP (VIP) address or other address representing a mitigation resource in the defense platform 140 and not to an IP address of the edge network 130 and use in peace, or no attack, times. For example, a request to a protected domain "www.mysite.com" would be replaced with "po.mysite.clouddetector.net", where such a fully qualified domain name (FQDN) is identified by a different domain name.

To mitigate excessive traffic directed to the application 114, in an embodiment, the edge network 130 may be configured with a dedicated access control list (ACL). To this end, routers or other elements in the edge network 130 may be configured with access permissions blocking traffic from any source IP addresses other than IP addresses of components of the defense platform 140 (e.g., addresses within a predetermined range) or whitelisted addresses for the edge network 130. In another embodiment, the mitigation action may include configuring the edge network 130 with an ACL when excessive utilization is detected. In implementations in which the edge network 130 is configured with an ACL when the attack is detected, returning to the peace mode may include removing the ACL and releasing mitigation resources from traffic cleaning, thereby concluding traffic redirection.

In an embodiment, the mitigation resource 141 may be configured to determine when a previously detected instance of excessive utilization is terminated. Upon such determination, the controller 147 returns to a peace mode of operation, i.e., traffic redirection is terminated and the operation is returned to its original operation such that traffic is directed from the EUDs 120 to the edge network 130 for delivery to the application 114.

As a non-limiting example for excessive volume utilization of cloud services by the cloud-hosted application 114, an end user device 120 initiates a DDOS attack against the application 114 by sending a high volume of seemingly legitimate HTTP or HTTPS requests to an application home page "www.application114service.com" for the application 114. The volume of the requests is not sufficient to disrupt the infrastructure of the edge network 130 or services provided by the cloud service provider of the cloud computing platform 110 such as CDN, DNS, WAF, FW, FaaS, and so on. These requests can be completely served by, for example, the CDN at the edge network 130, and therefore may cause excessive utilization of the CDN while barely affecting the application 114. When only telemetries from the cloud-hosted application 114 are analyzed, no excessive utilization will be detected, and the cloud-hosted application 114 works normally. To this end, multiple telemetries may be received from multiple sources concurrently and analyzed in order to detect excessive utilization of different cloud services. Based on the telemetries collected by the monitoring system 135, excessive utilization of the CDN is detected by the detector 143 by detecting an attack. The controller 147 causes redirection of traffic to the mitigation resource 141, which cleans the redirected traffic and sends the redirected traffic back to the edge network 130 for delivery to the application 114. As a result, only legitimate traffic is received at the application 114, thereby reducing costs derived from processing illegitimate traffic.

It should be noted that a single defense platform 140 and a single mitigation resource 141 are shown in FIG. 1 merely for simplicity purposes and without limitation on the disclosed embodiments. In some deployments, multiple defense platforms, each including one or more mitigation resources, can be utilized. Such deployments allow for elastic scalability, redundancy, locality, and high availability. All the entities of the architecture 100 can communicate through various data networks such as the global Internet, by dedicated tunnels or any other communication network, and the like.

It should also be noted that FIG. 1 is described with respect to a cloud service utilized by a single cloud-hosted application 114 hosted in a single cloud computing platform 110 merely for simplicity purposes, and that multiple cloud-hosted applications hosted in multiple cloud computing platforms, datacenters, or both, may be protected from excessive utilization of cloud services without departing from the scope of the disclosed embodiments.

The disclosed embodiments may be applicable to applications each partially hosted in one or more cloud computing platforms and partially hosted in one or more datacenters. Different applications, for example applications under the same fully qualified domain name (FQDN), may be protected without departing from the scope of the disclosure. Examples for protecting applications hosted in multiple cloud computing platforms are described further in U.S. patent application Ser. No. 15/907,905, assigned to the common assignee, the contents of which are hereby incorporated by reference.

Figure 2:
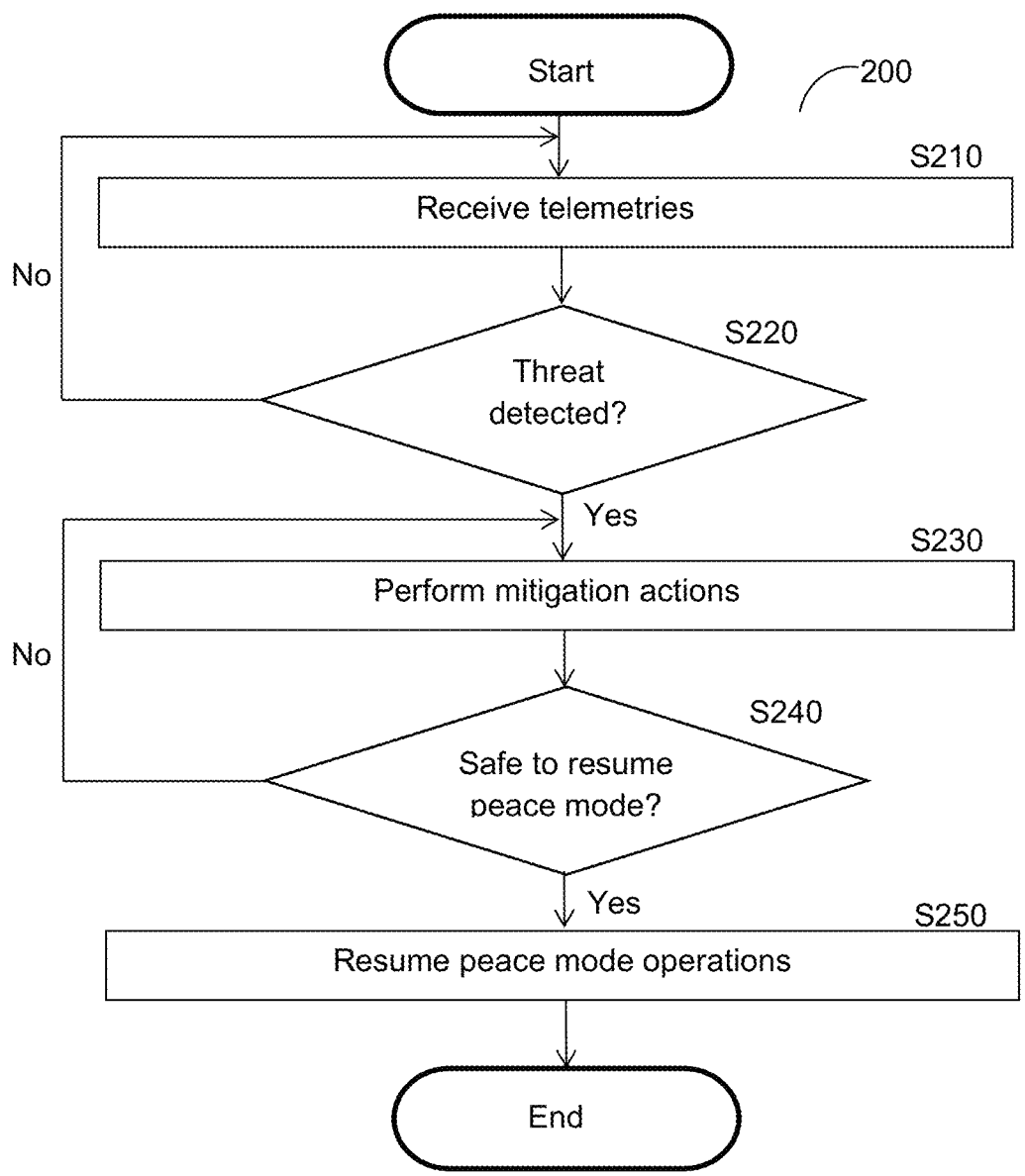
FIG. 2 is a flowchart illustrating a method for protecting against excessive utilization of cloud services by cloud-hosted applications according to an embodiment.

FIG. 2 is an example flowchart 200 illustrating a method for protecting against excessive utilization of cloud services according to an embodiment. The method may be utilized to mitigate excessive utilization of cloud services to protect owners of applications using the cloud services. In an embodiment, the method may be performed by a defense platform including at least a detector, a controller, and one or more mitigation resources.

At S210, telemetries are received at a detector located out-of-path of traffic between the cloud-hosted application and end user devices attempting to access content of the cloud-hosted application. The telemetries may be received from a plurality of sources. The sources may be monitoring systems (e.g., cloud monitoring, edge monitoring, application monitoring, etc.) or other systems that collect telemetries related to cloud service operations, and may be deployed in a cloud computing platform hosting an application, an edge network delivering traffic for the application, both, and the like. The cloud services may include services located at the cloud computing platform, at the edge network, or both. The telemetries may be received continuously, at predetermined time intervals (e.g., once every minute), and the like.

In an embodiment, different types of telemetries may be received from different sources. In a further embodiment, multiple detector instances may be implemented in order to detect excessive utilization via detection of different types of DDOS attacks. The different types of DDOS attacks may affect different telemetries and, therefore, each detector instance may receive different telemetries for use in detecting excessive utilization due to different types of DDOS attacks. For example, excessive utilization may be caused by a small stream of slow traffic typical of a low-and-slow attack, or by a high volume of traffic typical of a flood attack. Each detector instance may be configured to detect excessive utilization due to a different type of DDOS attack using a different set of telemetries.

In an embodiment, the received telemetries may include telemetries related to different cloud services. In some implementations, the telemetries may further be received from sources deployed in different edge networks, different cloud computing platforms, or both. Thus, each telemetry may be related to a different cloud service that may be overutilized due to, for example, a DDOS attack. The telemetries may be related to the different cloud services, performance of an application using the cloud services (e.g., with respect to availability, response time, transaction failure rates, etc.), both, and the like.

At S220, telemetries received at the detector are continuously processed to detect excessive utilization of a cloud service. The actual detection processing is performed periodically after each new period of telemetry collection is accomplished. Examples for such detections are provided herein above. In an embodiment, the detection includes determining if an increase in traffic volume directed to the edge network indicates excessive utilization, for example as compared to a learned baseline for the cloud service with respect to the cloud-hosted application. The excessive utilization may be caused by, but not limited to, a DDOS attack.

Examples for such attacks are provided herein above. Upon detection of an attack, execution continues with S230; otherwise, execution continues with S210. The detection may include, but is not limited to, comparing each received telemetric to one or more thresholds. The thresholds are learned baselines.

In an embodiment, S220 includes processing the received telemetries to extract features. The extracted features are evaluated by FIS engines. The FIS engines provide DoF scores to an expert system, which determined a DoA score as described herein.

In a further embodiment, S220 further includes categorizing telemetries with respect to different cloud services or application performance. A cloud-hosted application may utilize multiple cloud services, any of which may be subject to excessive utilization that may require scaling up of the cloud service, increased costs, decreased performance, combinations thereof, and the like. The categorization allows for detecting excessive utilization per cloud service rather than with respect to the infrastructures in which those cloud services operate. Such cloud services may include, but are not limited to, load balancing services, content delivery networks (CDNs), firewalls, web application firewalls, application programming interfaces, gateway services, media and streaming services, security services, storages, databases, framework as a service, analytics, developer tools, machine learning services, big data services, other function as a service (FaaS) services (serverless functions), and the like. The categorization may be based on, but not limited to, the sources from which the telemetries are collected (e.g., telemetries from a source deployed in the edge network and related to a CDN may belong to the same category).

The detector is configured to process the categorized telemetries separately in order to detect excessive utilization with respect to different cloud services. The separately categorized telemetries may be collected and processed concurrently, thereby allowing for multiple concurrent detections of excessive utilization of different cloud services. In some implementations, multiple detectors, each configured to detect excessive utilization of a different cloud service for a cloud-hosted application, may be utilized. Different detectors may be configured to, for example, process different telemetries or to detect excessive utilization with respect to different thresholds. In a further embodiment, metrics from different detectors may be combined.

At S230, when excessive utilization has been detected, from at least on active detector, at least one mitigation action is performed. The mitigation actions may include, but are not limited to, cleaning traffic, reconfiguring ACLs to prevent direct access to the cloud computing platform or edge network hosting the cloud services, or both. In an embodiment, a mitigation action also may include provisioning, configuring, or setting the mitigation resource.

In an embodiment, S230 may include causing redirection of traffic from the end user devices to a mitigation resource, cleaning the traffic (e.g., by filtering malicious or otherwise illegitimate traffic), and sending cleaned traffic back to the edge network. To this end, in an embodiment, the mitigation resource is a scrubbing center that cleans the traffic by removing malicious traffic and sends the clean traffic to an element in the edge network for distribution to the cloud-hosted application. The traffic redirection can be achieved using, for example, DNS redirection, BGP redirection, and the like.

In another embodiment, the mitigation action includes configuration of ACLs in the edge network to prevent direct access to elements therein, by attackers that are continuously using the IP address of the elements and not requesting DNS resolutions for the FQDNs of the elements, thereby ensuring that all traffic is directed to the defense platform prior to being redirected to the edge network. The configuration is performed using, for example, APIs. To this end, the mitigation action may include generating an ACL filtering IP addresses (or a range of IP addresses) not associated with entities in the defense platform, and configuring the cloud computing platform with the generated access control list. Thus, the mitigation action results in only allowing traffic from the defense platform, for example after cleaning by a mitigation resource. In an embodiment, ACLs generation can be performed by the controller 147.

At S240, it is determined whether it is safe to resume peace mode operations and, if so, execution continues with S250, where the traffic is redirected to the edge network for delivery to the cloud-hosted application. Otherwise, execution returns to S230. In an embodiment, S240 includes checking whether excessive utilization is still detected based on indication from the mitigation resource 141 and, if not, determining that it is safe to resume peace mode. It should be noted that continuing execution of the method may allow for, e.g., continuous or otherwise regular monitoring for potential threats.

As noted above, in an embodiment, the detection of excessive utilization is performed using at least one detection engine. Accordingly, mitigation resources may be deployed, a defense platform located out-of-path of traffic between end user devices and the cloud-hosted application. Specifically, the mitigation resources may be deployed in one or more scrubbing centers in one or more defense platforms, and traffic may be redirected by a controller in the defense platform when a DDOS attack is detected using the at least one detection engine.

It should be noted that FIG. 2 is depicted as performing mitigation actions periodically until it is safe to resume peace mode merely for simplicity purposes and without limitation on the disclosed embodiments. In some implementations, mitigation actions may be performed, for example, upon detection of a threat and then periodically thereafter.

Figure 3:
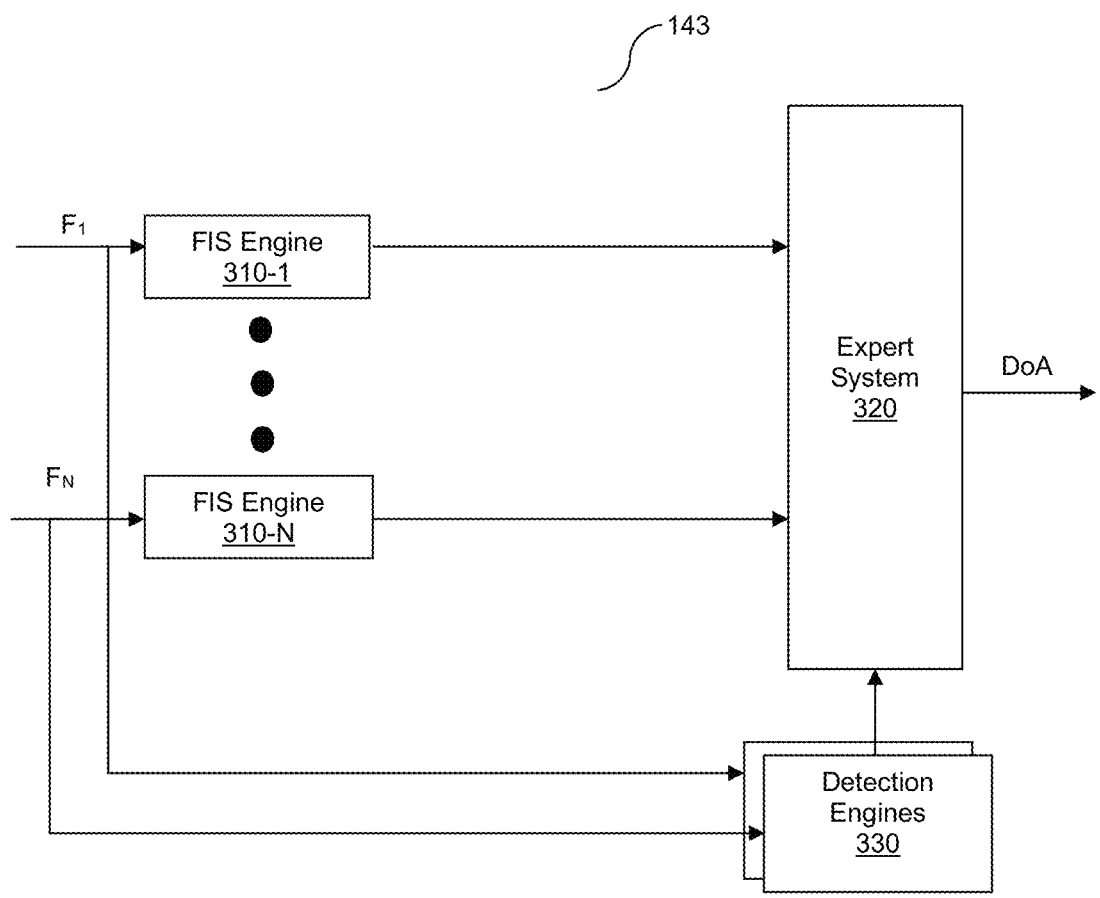
FIG. 3 is a block diagram illustrating detection by a detector according to an embodiment.

FIG. 3 shows an example block diagram illustrating detection by the detector 143 according to an embodiment. The detector 143 includes FIS engines 310-1 through 310-N (hereinafter referred to individually as a FIS engine 310 or collectively as FIS engines 310, merely for simplicity purposes), each of which may be configured as discussed herein with respect to FIG. 4 or FIG. 5. Each FIS engine 310 determines if values of a respective feature demonstrate normal or abnormal utilization behavior. To this end, each FIS engine 310 outputs a set of degree of fulfillment (DoF) scores. Each DoF score indicates the behavior group to which the observed features belong and feeds the determined DoF score to an expert system 320. The behavior groups may include, but are not limited to, normal, suspicious, and attack.

The detector 143 also optionally includes one or more detection engines 330. In an embodiment, each detection engine 330 operates as a single-dimension detector based on a single feature and its on-going calculated normal baseline level.

Figure 4:
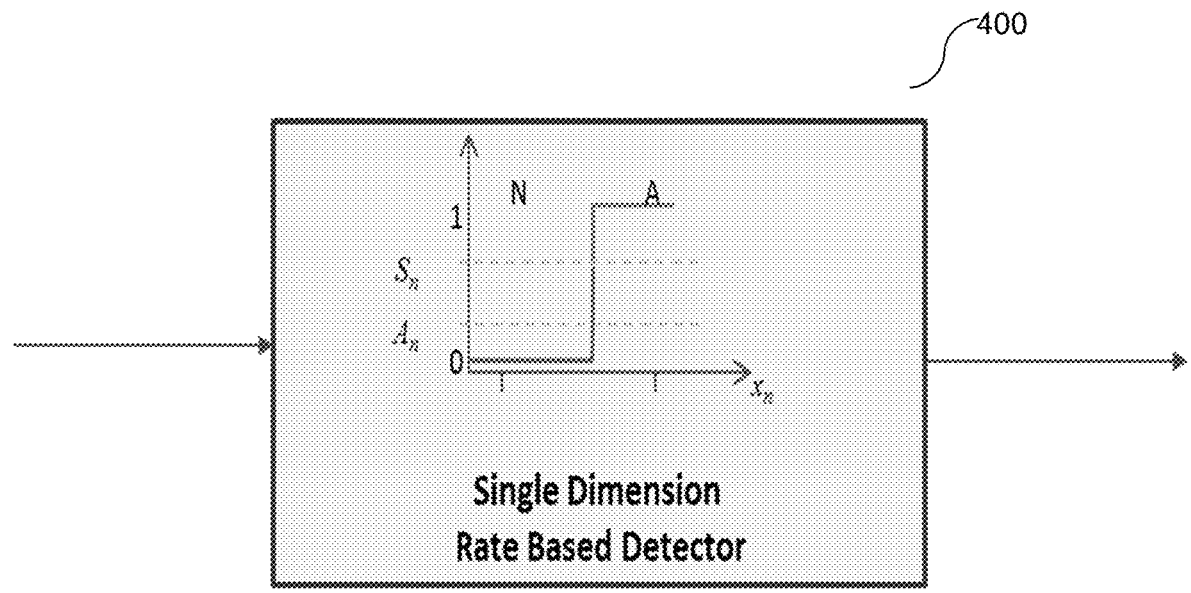
FIG. 4 is a simulation illustrating a single-dimension detection.

As illustrated in the example simulation 400 shown in FIG. 4, in a single dimension detection, a feature value is validated against one or more normal baseline levels. Detection is based on exceeding the baseline levels for a certain amount of time. To this end, the detection engine 330 may be configured to automatically compute the normal baseline levels based on monitored features (e.g., over a specified time period, such as the last day, week, or month, on an hourly basis), where instances of excessive utilization are detected based on deviations from the normal baseline levels. In an embodiment, the baseline levels may include high and low levels such that excessive utilization is detected as starting once the high levels has been surpassed for a predetermined period of time and as ending once the telemetric value falls below the low level for a predetermined period of time. Deviation from the baseline can be manually defined as a percentage (or by others) or can be automatically set, for example as 4 times the standard deviation.

Figure 5:
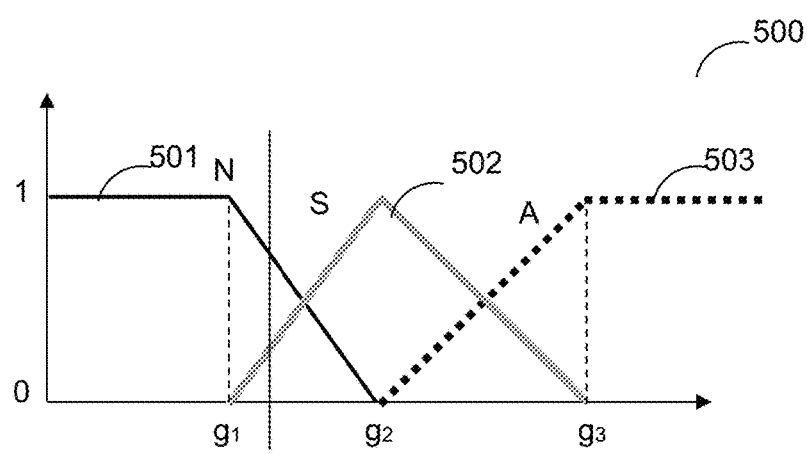
FIG. 5 is a simulation illustrating a multiple-dimension detection by a fuzzy logic inference system engine.

As demonstrated in FIG. 5, a FIS engine 500 uses input membership functions for multiple dimension fuzzy logic analysis. In the example shown in FIG. 5, the function 501 is a non-attack membership function, the function 502 is a potential attack membership function, and the function 503 is an attack membership function. The membership functions 501, 502, and 503 determine a deterministic score, which is a degree of fulfilment (DoF) of the specific feature. The DoF score defines a behavior group (Attack, Suspicious, Normal) that a set of observed features belong to. The DoF scores are evaluated based on certain "breaking points". Such breaking points are shown as $g_1$ for function 501, $g_2$ for function 502, and $g_3$ for function 503.

The values $g_1$, $g_2$, and $g_3$ are dynamically and adaptively computed based on the received telemetries. For example, any of the values $g_1$, $g_2$, and $g_3$ can be set based on one or more learned baselines. Such baselines may be computed based on moving average telemetries received on the above-mentioned features during a specified time period, such as the last day, week, or month, on an hourly basis. In another embodiment, any of the values $g_1$, $g_2$, and $g_3$ can be computed based on normalized variance of the incoming data (traffic parameters of the defined feature) and the current baseline levels. Examples for computing the baseline levels are discussed in U.S. patent application Ser. No. 15/483,398, assigned to the common assignee, which is hereby incorporated by reference.

According to one embodiment, the FIS engine 500 can be configured to evaluate (fuzzification) each of the features noted above using the appropriate adapted membership function. The result of the evaluation is a DoF score for each feature. The DoF score is scaled to a value between 0 and 1.

In an embodiment, for each moment in time, every graph of a membership function provides three degrees of fulfillment (DoF) scores: DoF for Normal, DoF for Suspicious, and DoF for Attack. The DoF score may be computed as follows: given a graph for a feature and the current value of the feature, a vertical line corresponding to the X coordinate of the feature may be "plotted." As an example, such a computation may result in $DoF^N=0.66$, $DoF^S=0.34$, $DoF^A=0$.

In an embodiment, the FIS engine 500 can be realized through implementation of adaptive algorithms, thereby allowing each detection engine to be continually tuned to fit characteristics of the applicative utilization behavior, i.e., utilization behavior relates to the respective service. Such adaptive algorithms may include, for example, Infinite Impulse Response (IIR) filters, which continually compute a baseline based on the traffic parameters (e.g., rates of HTTP/HTTPS requests, responses, or both) and modify fuzzy logic breaking points membership functions accordingly. The use of fuzziness for representing the quantitative features monitored for detection of DDOS attacks generally eliminates the abrupt separation of abnormality from normality, providing a measure of the degree of abnormality or normality of a given feature. It should be appreciated that the fuzzy logic techniques allow for automatic detection and then mitigation of attacks, and thus eliminates the need for manual protection policy refinements. Using predefined polices does not provide optimal defense against known and emerging threats. Due to the optimal defense provided by the fuzzy logic techniques, legitimate high utilization of cloud services will not be detected as excessive utilization and, therefore, will not trigger unnecessary mitigation actions.

Example implementation of fuzzy logic engines for detecting traffic attributes related to DDOS and DoS can be found in U.S. Pat. Nos. 7,681,235 and 7,836,496, assigned to the common assignee, which are hereby incorporated by reference.

Returning to FIG. 3, the expert system 320 is configured to determine a degree of attack (DoA) score based in part on the DoF scores fed from the FIS engines 310. As noted above, each FIS engine 310 operates on a respective feature $F_1$ through $F_N$ and outputs a set of DoF scores representing normal, suspicious, and attack activity. Thus, the expert system 320 is configured to perform at least a multiple dimension detection based on the outputs of the FIS engines 310.

The determined DoA is compared to a predefined threshold, where any DoA score exceeding this threshold would trigger an alert or a signal that a DDOS attack has been detected. In an optional embodiment, inputs fed from the detection engines 330 are also considered by the expert system 320 if and when an alert is triggered. In an alternative embodiment, only inputs from the FIS engines 310 are considered. Alternatively, or collectively, the inputs from the detection engines 330 may be utilized for the detections. Such inputs would be triggered upon crossing one or more normal baseline levels. It should be appreciated that in some embodiments, one, some, or all of the features can be considered in the DoA determination.

Therefore, by implementing the disclosed embodiments, the detector 143 provides an out-of-path (OOP) detection of attacks committed against protected cloud applications distributed via edge networks.

In an embodiment, the detector 143 can be utilized to detect excessive utilization of L7-related services by detecting L7 flood DDOS attacks in cloud services used for delivering traffic to and from the cloud-hosted application 114. The cloud services may be located in the cloud computing platform 110, the edge network 130, and the like. The detection of flood DDOS attacks may be based on features such as, but not limited to, a request rate (request per second (RPS), which is a rate-based feature), and an average request size (ARS) (which is a rate-invariant feature). Example techniques for detecting and mitigating flood type DDOS attacks for cloud-hosted applications are described further in the above-noted U.S. patent application Ser. No. 15/685,484, the contents of which are hereby incorporated by reference.

In another embodiment, the detector 143 can be utilized to detect excessive utilization of L7 services by detecting slow application layer DDOS attacks. The detection of slow application layer DDOS attacks may be based on features such as, but not limited to, new connections per second (NCPS); connections per second (CPS); and average connection size (ACS). Example techniques for detecting and mitigating slow application layer DDOS attacks are described further in U.S. patent application Ser. No. 15/657,499, assigned to the common assignee, the contents of which are hereby incorporated by reference.

In another embodiment, the detector 260 can be utilized to detect excessive utilization of L3-L4 services (e.g., CDN, load balancer, etc.) by detecting L3-L4 network layer floods DDOS attacks. The detection of network layer flood DDOS attacks may be based on features such as, but not limited to, number of packets and bytes per seconds of TCP, UDP, ICMP and other IP traffic; number of SYN or other flags of TCP; and so on.

It should further be noted that, while the detector 143 is employed using these features, it will not falsely detect excessive utilization based on a high-volume of legitimate traffic. For example, during a sales event on an e-commerce website, the RPS (request rate) may increase, but the ARS, average request size, remains the same. The legitimate changes in utilization behavior will not be detected as a deviation representing excessive utilization.

Figure 6:
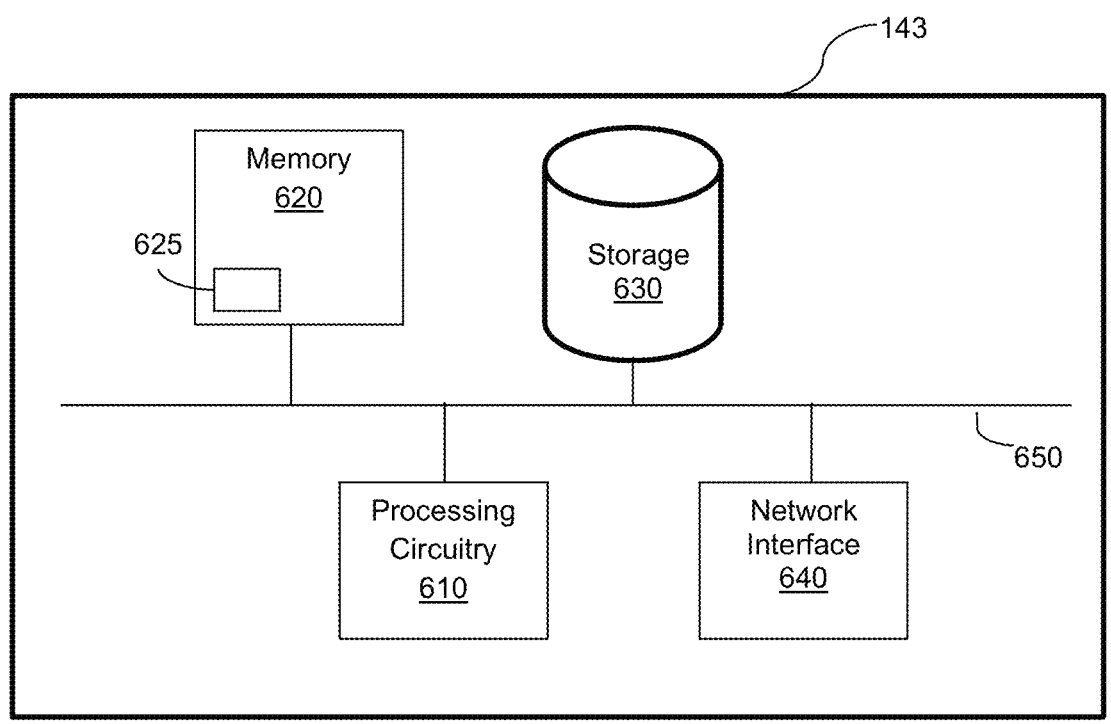
FIG. 6 is a schematic diagram of a detector according to an embodiment.

The various elements of the detector 143 as illustrated in FIG. 3 can be realized using one or more processing circuitries as shown, for example, in FIG. 6.

FIG. 6 is an example block diagram of the detector 143 according to an embodiment. The detector 143 includes a processing circuitry 610 coupled to a memory 620, a storage 630, and a network interface 640. In an embodiment, the components of the detector 143 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 620 may be volatile (e.g., RAM, etc.), non-volatile (e.g., ROM, flash memory, etc.), or a combination thereof. In one configuration, computer readable instructions to implement one or more embodiments disclosed herein may be stored in the storage 630.

In another embodiment, the memory 620 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 210 to perform the various processes described herein. Specifically, the instructions, when executed, cause the processing circuitry 610 to perform out-of-path detection and mitigation of cyber-attacks, as discussed hereinabove. In a further embodiment, the memory 720 may further include a memory portion 625 including the instructions.

The storage 630 may be magnetic storage, optical storage, and the like, and may be realized, for example, as flash memory or other memory technology, CD-ROM, Digital Versatile Disks (DVDs), hard-drives, SSD, or any other medium which can be used to store the desired information. The storage 630 may store communication consumption patterns associated with one or more communications devices.

The network interface 640 allows the detector 143 to communicate with the monitoring system 135 in order to receive telemetries and alerts related to utilization behavior. The network interface 840 further allows the detector 143 to communicate with the edge network 130 and the mitigation resource 141 for purposes of redirecting traffic to the mitigation resource 141.

It should be understood that the embodiments described herein are not limited to the specific architecture illustrated in FIG. 6, and that other architectures may be equally used without departing from the scope of the disclosed embodiments.

It should be further noted that each of the controller 147 and the mitigation resource 141 may be realized using a computing architecture, similar to the architecture illustrated in FIG. 6, and that other architectures may be equally used without departing from the scope of the disclosed embodiments.

Figure 7:
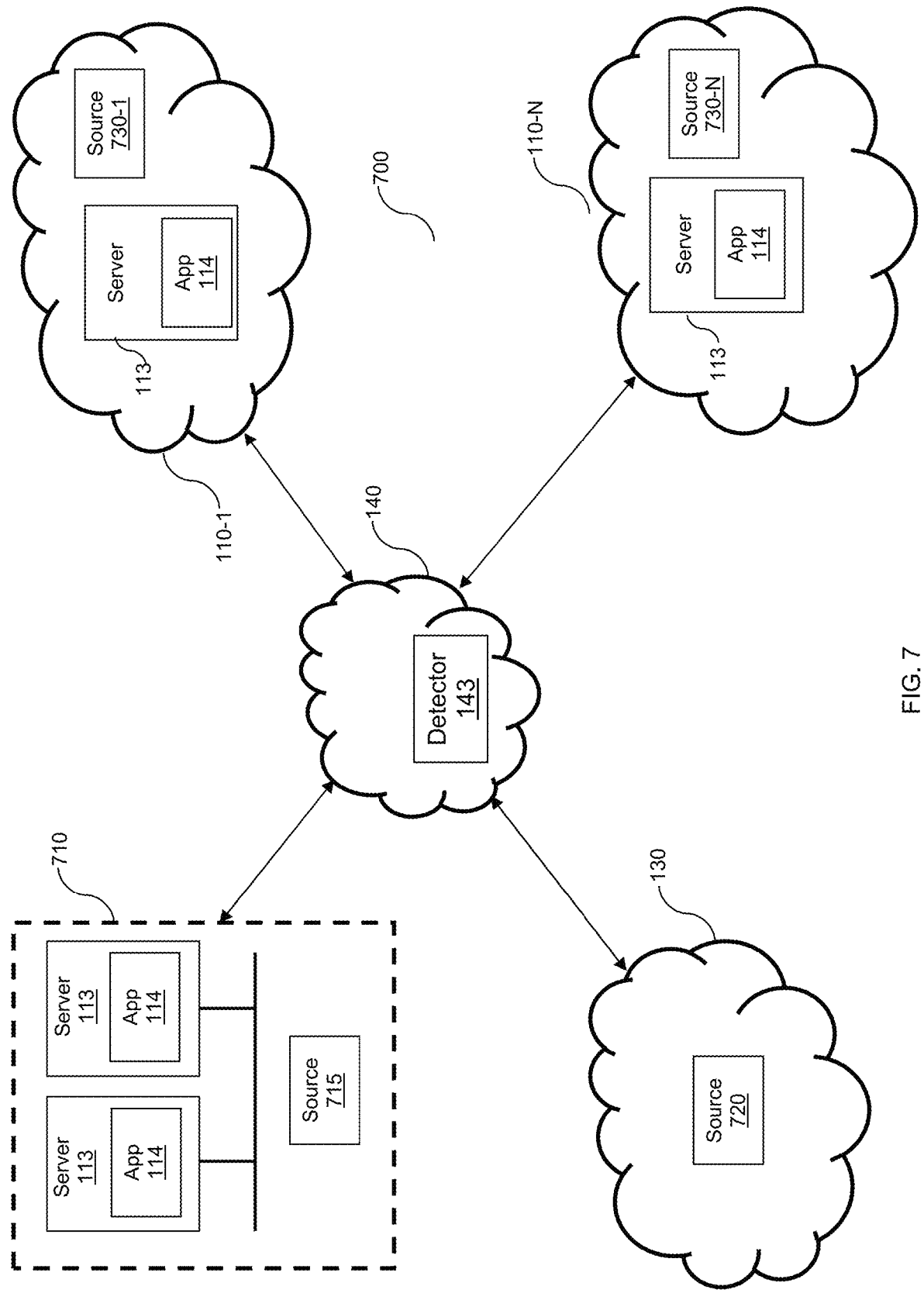
FIG. 7 is a network diagram of a cloud-hosted architecture utilized to describe various disclosed embodiments.

FIG. 7 is an example network diagram of a multi-cloud architecture 700 utilized to describe the various disclosed embodiments. The multi-cloud architecture 700 includes a plurality of cloud computing platforms 110-1 through 110-N (where N is an integer greater than 1), a datacenter 710, an edge network 130, and a defense platform 140. Each cloud computing platform 110 may be configured, for example, as described herein above in FIG. 1. The datacenter 710 may be an on-premises datacenter. It should be noted that embodiments disclosed herein can support multiple datacenters.

Each of the cloud computing platforms 110-1 through 110-N and the datacenter 710 executes an application 114, which is utilized to provide a cloud service to be protected. As noted above, an application 114 may be a web application, a cloud-hosted application, or any other software application or software resource executed by a server.

The cloud computing platforms 110-1 through 110-N, the datacenter 710, and the edge network 130 may each include one or more sources. In the example implementation shown in FIG. 7, the data center 710 may include a source 715, the edge network 130 includes a source 720, and the cloud computing platforms 110 each include a respective source 730. The sources may be, for example, monitoring systems or other systems configured to collect telemetries related to operation of cloud services hosted in the cloud computing platforms 110, the data center 710, or the edge network 130.

Often, the applications 114 are associated with the same tenant (customer). Typically, the execution of the application 114 is performed by a server (collectively shown as servers 113). Each server 113 may be a virtual machine or a physical machine. A virtual machine may include any virtual environment for executing code or applications.

The protection of the application 114 hosted in the multi-cloud architecture 700 against excessive utilization is performed by means of the defense platform 140. In an embodiment, the defense platform 140 is a cloud computing platform managed by a cloud security vendor (or managed security service provider) that is not one of the service providers of the cloud computing platforms 110-1 through 110-N.

In an embodiment, the defense platform 140 is configured to collect or receive telemetries from, e.g., monitoring systems (e.g., the monitoring system 115, FIG. 1) deployed in each of the cloud platforms 110, in the data center 710, in the edge network 130, in a combination thereof, and the like. Based on the received telemetries, a detector 143 deployed in the defense platform 140 is configured to detect excessive utilization of a cloud service by one of the applications 114. In some implementations, the detector 143 may be deployed in-line in the edge network 130, the cloud platform 110, or the data center 710. Multiple detectors deployed in multiple networks, platforms, or data centers may be equally utilized.

When excessive utilization is detected, the traffic is redirected to the defense platform 140. In an example embodiment, the redirection is performed through a DNS configuration as discussed below in an automated fashion, i.e., without requiring a user to reconfigure the DNS entry. In some configurations, the redirection can be triggered by a user.

The defense platform 140 is configured to "clean" any illegitimate traffic (data packets) from the received traffic. The cleaned traffic is redirected back to the edge network 130 for delivery to the destination server 113 hosting the application 114 that the traffic was originally directed to. The arrangement and operation of the defense platform 140 is described further herein above in FIG. 1.

In some optional embodiments, when the excessive utilization ends, following a predefined cool-down period set to eliminate attack diversion flipping, the traffic diversion is stopped and traffic is again sent to the destination application directly. This eliminates unnecessary latency throughout the solution lifecycle.

It should be noted that the example implementation shown in FIG. 7 is described with respect to the applications 114 hosted in cloud computing platforms 110-1 through 110-N, as well as a single protected data center 710, merely for simplicity purposes and without limitation on the disclosed embodiments. More or fewer cloud computing platforms, data centers, or both, may be protected without departing from the scope of the disclosure. It should be further noted that the disclosed embodiments can operate in multiple-cloud architectures including only two cloud computing platforms or a cloud computing platform and a datacenter. That is, the cloud-hosted application can be hosted and executed in one or more different and exclusive-mutual platforms.

It should be further noted that two or more defense platforms 140 can be utilized and deployed in the multi-cloud architecture 700 in accordance with the disclosed embodiments.

It should also be noted that various implementations are described as protecting against DDOS attacks merely for example purposes and without limitations on the scope of the disclosure. Excessive utilization that is not caused by DDOS attacks may be equally protected against without departing from the disclosed embodiments. Specifically, various embodiments are described with respect to detecting DDOS attacks based on deviations from learned baseline utilization behavior of cloud service utilization by an application. A person having ordinary skill in the art would understand that the techniques described herein may be applied to detect deviations caused by excessive utilization that is not due to DDOS attacks.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A defense platform for protecting against excessive utilization of at least one cloud service used for providing a cloud-hosted application, wherein the defense platform is deployed out-of-path of traffic between a plurality of end user devices and the cloud-hosted application, comprising:
   at least one detector;
   a mitigator; and
   a controller communicatively connected to the detector and the mitigator;
   wherein the at least one detector is configured to:
      receive telemetries from a plurality of sources, wherein each source is configured to collect telemetries related to the traffic between a plurality of end user devices and an edge network configured at least to distribute traffic for the cloud-hosted application, wherein the telemetries are out-of-path information with respect to traffic to and from the cloud-hosted application and wherein at least a portion of the telemetries collected are related to operation of a portion of at least one cloud computing platform hosting the cloud-hosted application;
      detect, based on the collected telemetries and at least one learned normal utilization behavior of each cloud service for the cloud-hosted application, excessive utilization of at least one of the at least one cloud service by the cloud-hosted application;
   wherein the controller, upon detection of the excessive utilization of the at least one cloud service by the cloud-hosted application, is configured to cause mitigation, by the mitigator, of the excessive utilization of each cloud service;
   wherein traffic to and from the cloud-hosted application is delivered at least partially via at least one edge network; and
   wherein the plurality of sources includes at least one source deployed in the at least one cloud computing platform and at least one source deployed in the at least one edge network.

2. The defense platform of claim 1, wherein the cloud-hosted application is hosted in a plurality of cloud computing platforms of which the at least one cloud computing platform is one.

3. The defense platform of claim 2, wherein the plurality of sources includes at least one source configured to collect telemetries from within one of the plurality of cloud computing platforms.

4. The defense platform of claim 2, wherein the plurality of sources includes at least one source located within one of the plurality of cloud computing platforms and configured to collect telemetries therefrom.

5. The defense platform of claim 1, wherein the cloud-hosted application is at least partially hosted in an on-premises datacenter, wherein at least one of the at least one cloud service is hosted in the on-premises datacenter.

6. The defense platform of claim 1, wherein the at least one cloud service includes at least one cloud service provided via the at least one cloud computing platform and at least one cloud service provided via the at least one edge network, wherein each detector is configured for multiple concurrent detection of excessive utilization of any of the at least one cloud service.

7. The defense platform of claim 6, wherein the detected excessive utilization includes excessive utilization of the at least one cloud service provided via the at least one cloud computing platform and of the at least one cloud service provided via the at least one edge network.

8. The platform of claim 1, wherein the controller is further configured to: divert traffic related to the excessive utilization of each cloud service by the cloud-hosted application from the plurality of end user devices to the defense platform; cause the mitigator to perform at least one mitigation action including removing illegitimate traffic from the diverted traffic; and cause injection of clean traffic for delivery to the cloud-hosted application, thereby reducing excessive utilization of the at least one cloud service by the cloud-hosted application.

9. The defense platform of claim 1, wherein the excessive utilization is caused by a distributed denial-of-service (DDOS) attack, wherein the detection of the excessive utilization includes detecting the DDOS attack.

10. The defense platform of claim 1, wherein the excessive utilization increases costs associated with using the cloud services for operation of the cloud-hosted application.

11. The defense platform of claim 1, further comprising: an application delivery controller (ADC), wherein the ADC is configured to inject the clean traffic for delivery to the cloud-hosted application.

12. The define platform of claim 1, wherein traffic to and from the cloud-hosted application is delivered at least partially via an edge network.

13. The defense platform of claim 12, wherein a content delivery network (CDN) is deployed in the edge network.

14. The defense platform of claim 1, wherein the defense platform is a stand-alone cloud computing platform that does not host the cloud-hosted application.

15. The defense platform of claim 1, wherein the received telemetries include traffic parameters related to at least one of: layer-7, and layer-3 to layer-4.

16. The defense platform of claim 15, wherein the at least one detector is configured to detect excessive utilization caused by a distributed denial-of-service (DDoS) attack, wherein the DDOS attack is any one of: a layer-7 flood DDOS attack, a layer-7 slow DDOS attack, and a layer-3 to layer-4 flood DDOS attack.

17. The defense platform of claim 1, wherein the at least one cloud service includes any one of: a load balancing service, a content delivery network (CDN) service, a firewall service, a web application firewall (WAF) service, a DNS service, an application programming interface, a gateway service, a streaming service, a security service, a storage service, a developer tools, a machine learning service, and a serverless service.

18. A method for protecting against excessive utilization of at least one cloud service used for providing a cloud-hosted application, comprising:
   receiving, at a defense platform deployed out-of-path of traffic between a plurality of end user devices and the cloud-hosted application, telemetries from a plurality of sources, wherein each source is configured to collect telemetries related to at least one of the at least one cloud service, wherein the telemetries are out-of-path information with respect to traffic to and from the cloud-hosted application and wherein at least a portion of the telemetries collected are related to operation of a portion of at least one cloud computing platform hosting the cloud-hosted application;
   detecting, based on the collected telemetries and a learned normal utilization behavior for the cloud-hosted application, excessive utilization of at least one of the at least one cloud service by the cloud-hosted application;
   causing mitigation, at the defense platform, of the excessive utilization of each cloud service upon detection of the excessive utilization of the at least one cloud service by the cloud-hosted application;
   wherein traffic to and from the cloud-hosted application is delivered at least partially via at least one edge network; and
   wherein the plurality of sources includes at least one source deployed in the at least one cloud computing platform and at least one source deployed in the at least one edge network.

19. A system for protecting against excessive utilization of at least one cloud service used for providing a cloud-hosted application, comprising:
   a processing circuitry; and
   a memory, the memory containing instructions that, when executed by the processing circuitry, configure the system to:
   receive, at a defense platform deployed out-of-path of traffic between a plurality of end user devices and the cloud-hosted application, telemetries from a plurality of sources, wherein each source is configured to collect telemetries related to at least one of the at least one cloud service, wherein the telemetries are out-of-path information with respect to traffic to and from the cloud-hosted application and wherein at least a portion of the telemetries collected are related to operation of a portion of at least one cloud computing platform hosting the cloud-hosted application;
   detect, based on the collected telemetries and a learned normal utilization behavior for the cloud-hosted application, excessive utilization of at least one of the at least one cloud service by the cloud-hosted application;
   cause mitigation, at the defense platform, of the excessive utilization of each cloud service upon detection of the excessive utilization of the at least one cloud service by the cloud-hosted application;
   wherein traffic to and from the cloud-hosted application is delivered at least partially via at least one edge network; and
   wherein the plurality of sources includes at least one source deployed in the at least one cloud computing platform and at least one source deployed in the at least one edge network.

* * * * *